(12) United States Patent
Jeon et al.

(10) Patent No.: US 10,851,904 B2
(45) Date of Patent: Dec. 1, 2020

(54) CHECK VALVE

(71) Applicant: MANDO CORPORATION, Gyeonggi-do (KR)

(72) Inventors: In Wook Jeon, Seoul (KR); Kiwon Kang, Gyeonggi-do (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 15/985,671

(22) Filed: May 21, 2018

(65) Prior Publication Data

US 2018/0335154 A1 Nov. 22, 2018

(30) Foreign Application Priority Data

May 22, 2017 (KR) .................. 10-2017-0062742

(51) Int. Cl.
| | |
|---|---|
| *F16K 15/06* | (2006.01) |
| *B60T 15/36* | (2006.01) |
| *B60T 8/34* | (2006.01) |
| *F16K 15/02* | (2006.01) |
| *B60T 13/68* | (2006.01) |
| *B60T 17/04* | (2006.01) |

(52) U.S. Cl.
CPC ............ *F16K 15/063* (2013.01); *B60T 8/341* (2013.01); *B60T 13/686* (2013.01); *B60T 15/36* (2013.01); *B60T 17/04* (2013.01); *F16K 15/026* (2013.01)

(58) Field of Classification Search
CPC ...... F16K 15/063; F16K 15/026; B60T 15/36; B60T 8/341; B60T 17/04; B60T 13/686
See application file for complete search history.

(56) References Cited

U.S. PATENT DOCUMENTS

| 664,146 | A | * | 12/1900 | Hackett | ................... F16K 15/06 |
| | | | | | 137/533.25 |
| 1,716,896 | A | * | 6/1929 | Miller | ................. F04B 53/1027 |
| | | | | | 251/175 |

(Continued)

FOREIGN PATENT DOCUMENTS

| JP | 10-103581 | 4/1998 |
| JP | 2015-102139 A | 6/2015 |

(Continued)

*Primary Examiner* — Jessica Cahill
*Assistant Examiner* — Patrick C Williams
(74) *Attorney, Agent, or Firm* — Morgan, Lewis & Bockius LLP

(57) ABSTRACT

Disclosed herein is a check valve. The check valve includes a valve housing having upper and lower ends opened and having an inlet formed along the circumference of the valve housing, the inlet linked to a inlet fluid path, an upper cap coupled to seal up an open upper portion of the valve housing, a lower holder coupled to an open lower portion of the valve housing, having an outlet formed along the circumference of the lower holder, the outlet linked to a outlet fluid path, and having a guide hole in the lower portion of the lower holder, and a plunger installed to move up or down to selectively open or close an orifice while elastically supported by an elastic member supported by the lower holder, wherein the plunger comprises guides at upper and lower ends of the plunger to guide the plunger to make stable linear motion.

16 Claims, 11 Drawing Sheets

(56) References Cited

U.S. PATENT DOCUMENTS

| | | | | |
|---|---|---|---|---|
| 1,923,621 | A * | 8/1933 | Frank | F16K 17/00 |
| | | | | 251/50 |
| 2,011,547 | A * | 8/1935 | Campbell | F04B 53/1027 |
| | | | | 137/516.29 |
| 2,163,472 | A * | 6/1939 | Shimer | F04B 53/1027 |
| | | | | 137/516.29 |
| 2,197,455 | A * | 4/1940 | Volpin | F04B 53/1025 |
| | | | | 137/514.5 |
| 2,397,269 | A * | 3/1946 | Kelly | F16K 1/36 |
| | | | | 137/516.29 |
| 3,845,781 | A * | 11/1974 | Hansen | F16K 15/026 |
| | | | | 137/331 |
| 4,368,756 | A * | 1/1983 | Carlson | F16K 15/06 |
| | | | | 137/541 |
| 5,062,452 | A * | 11/1991 | Johnson | F04B 53/1027 |
| | | | | 137/533.25 |
| 2013/0146159 | A1* | 6/2013 | Ro | F16K 15/063 |
| | | | | 137/538 |

FOREIGN PATENT DOCUMENTS

| | | |
|---|---|---|
| KR | 10-2013-0092045 | 8/2013 |
| KR | 10-1622146 | 5/2016 |

* cited by examiner

CHECK VALVE

CROSS-REFERENCE TO RELATED APPLICATION

This application is based on and claims priority under 35 U.S.C. § 119 to Korean Patent Application No. 10-2017-0062742 filed on May 22, 2017, in the Korean Intellectual Property Office, the disclosure of which is incorporated herein by reference in its entirety.

BACKGROUND

1. Field of the Invention

The present disclosure relates to a check valve, and more particularly, to a check valve equipped in a hydraulic fluid path of an electric braking system.

2. Discussion of Related Art

Generally, braking systems are for efficiently preventing wheel slippage that might happen when the vehicle applies the brakes, shoots ahead, or races forward, and have a plurality of solenoid valves for controlling braking oil pressure transferred from the master cylinder to the wheel cylinder and a plurality of check valves for preventing back flows of the oil installed in a modulator block having fluid paths forming hydraulic circuits to control the braking oil pressure. An electric braking system has recently been used, which is equipped with a fluid pressure applier for receiving the driver's intention of braking from a pedal displacement sensor for detecting displacement of the brake pedal when the driver steps on the brake pedal in an electric signal and applying the pressure to the wheel cylinder. A structure of this electric braking system is disclosed in the Korean patent publication No. 10-2013-0092045. In the document, the electric braking system equipped with the fluid pressure supplier is configured to generate braking pressure by the motor operated according to the pedal effort of the brake pedal. In this regard, the braking pressure is generated by transforming the rotational force of the motor to a linear motion to press the piston.

Check valves are installed at proper points in the fluid path formed in the modulator block to control a flow of oil in one direction. For example, the check valves are installed in a fluid path connecting the pressure applier and a reservoir and a fluid path connected to an inlet valve of each hydraulic circuit. These check valves, however, have relatively low sealing performance against low pressure and high pressure, and are vulnerable to a system requiring high response performance because they have low reactivity (mobility).

REFERENCE

Korean Patent Publication No. 102013-0092045 (published on Aug. 20, 2013)

SUMMARY OF THE INVENTION

Embodiments of the present disclosure provide a high-capacity check valve having high sealing performance and applicable to a system requiring a quick response.

In accordance with an aspect of the present disclosure, a check valve installed in a bore of a modulator block having an inlet fluid path and an outlet fluid path to control one-way flow of oil, the check valve includes a valve housing having upper and lower ends opened and having an inlet formed along the circumference of the valve housing, the inlet linked to the inlet fluid path, an upper cap coupled to seal up an open upper portion of the valve housing, a lower holder coupled to an open lower portion of the valve housing, having an outlet formed along the circumference of the lower holder, the outlet linked to the outlet fluid path, and having a guide hole in the lower portion of the lower holder, and a plunger installed to move up or down to selectively open or close an orifice while elastically supported by an elastic member supported by the lower holder, wherein the plunger comprises guides at upper and lower ends of the plunger to guide the plunger to make stable linear motion.

A sheet member supported by the inner wall of the valve housing and having the orifice formed in the center of the sheet member, wherein the guide is provided to be able to move by being guided into the orifice and the guide hole.

The plunger includes a disc-shaped sheet portion at the top end of the plunger, the sheet portion closely contacting the bottom face of the sheet member to selectively open or close the orifice, and a disc-shaped elastic member attachment portion in the lower portion of the plunger for the elastic member to be fitted to the elastic member attachment portion.

The guide includes at least one upper projection extending upward from the top face of the sheet portion and contacting and slidingly moving on the inner circumferential face of the orifice, and at least one lower projection extending downward from the bottom face of the elastic member attachment portion and contacting and slidingly moving on the inner circumferential face of a guide hole.

The at least one upper projection is arranged on the top face of the sheet portion along a circumferential direction corresponding to the diameter of the orifice at predetermined intervals not to seal up the orifice.

The plunger includes a sealing member coming into contact with the bottom face of the sheet member when the sheet portion seals up the orifice.

A seal attachment portion concaved along the circumferential direction of the plunger located between the sheet portion and the attachment portion to couple with the sealing member.

The valve housing includes a step formed on the inner face of the valve housing to support the top face of the sheet member, and the inlet and the outlet is divided vertically by the sheet member supported by the step.

A filter member coupled to the valve housing to filter out foreign materials flowing into the inlet.

The diameter of the elastic member attachment portion is larger than the diameter of the guide hole in order to constrain the position of down movement of the plunger when the plunger moves down.

The sheet member has a sheet portion receiving groove formed in a lower portion of the sheet member, the sheet portion receiving groove concaved with a diameter corresponding to the sheet portion.

The valve housing has a sheet forming portion formed on the inner circumferential wall of the valve housing, the sheet forming portion extending inward from the valve housing to form the orifice.

The guide is provided to be able to move by being guided into a guide projection protruding under the upper cap or the guide hole.

The plunger includes a plunger body in the form of a cylinder elongated in the vertical direction, the plunger body having a guide hole formed at the top end of the plunger body for the guide projection to be inserted thereto and moved therein, at least one lower projection formed at the bottom end of the plunger body to be able to contact and slidingly move on the inner circumferential face of the guide hole, and a sheet portion formed in the longitudinal center of the plunger body to extend outward from the plunger body to be able to contact the sheet forming portion in order to selectively open or close the orifice.

The plunger body located above the sheet portion includes a fluid path forming portion with a smaller diameter than the sheet portion to form the orifice along with the sheet forming portion when the plunger body moves down.

The plunger body located under the sheet portion comprises a sealing member coming into contact with the bottom face of the sheet forming portion to seal up the orifice.

The sheet forming portion includes a curved plane guiding oil flowing in through the inlet downward, a vertical plane extending vertically from the bottom end of the curved plane to contact the sheet portion, and a horizontal plane bending at the right angle from the bottom end of the vertical plane to contact the sealing member.

The valve housing includes a sheet forming portion along the inner circumferential wall of the valve housing, the sheet forming portion extending inward from the valve housing to form the orifice, and wherein the sheet forming portion includes a sheet portion receiving groove in a lower portion of the sheet forming portion, the sheet portion receiving groove concaved with a diameter corresponding to the sheet portion formed at the upper end of the plunger for the sheet portion to be inserted thereto and make close contact therewith.

The plunger includes a sealing member coming into contact with the bottom face of the sheet forming portion when the sheet portion enters into the sheet forming portion, and wherein the sealing member coming into contact with the bottom face of the sheet forming portion has a sealing portion protruding no further than the top of the sheet portion.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
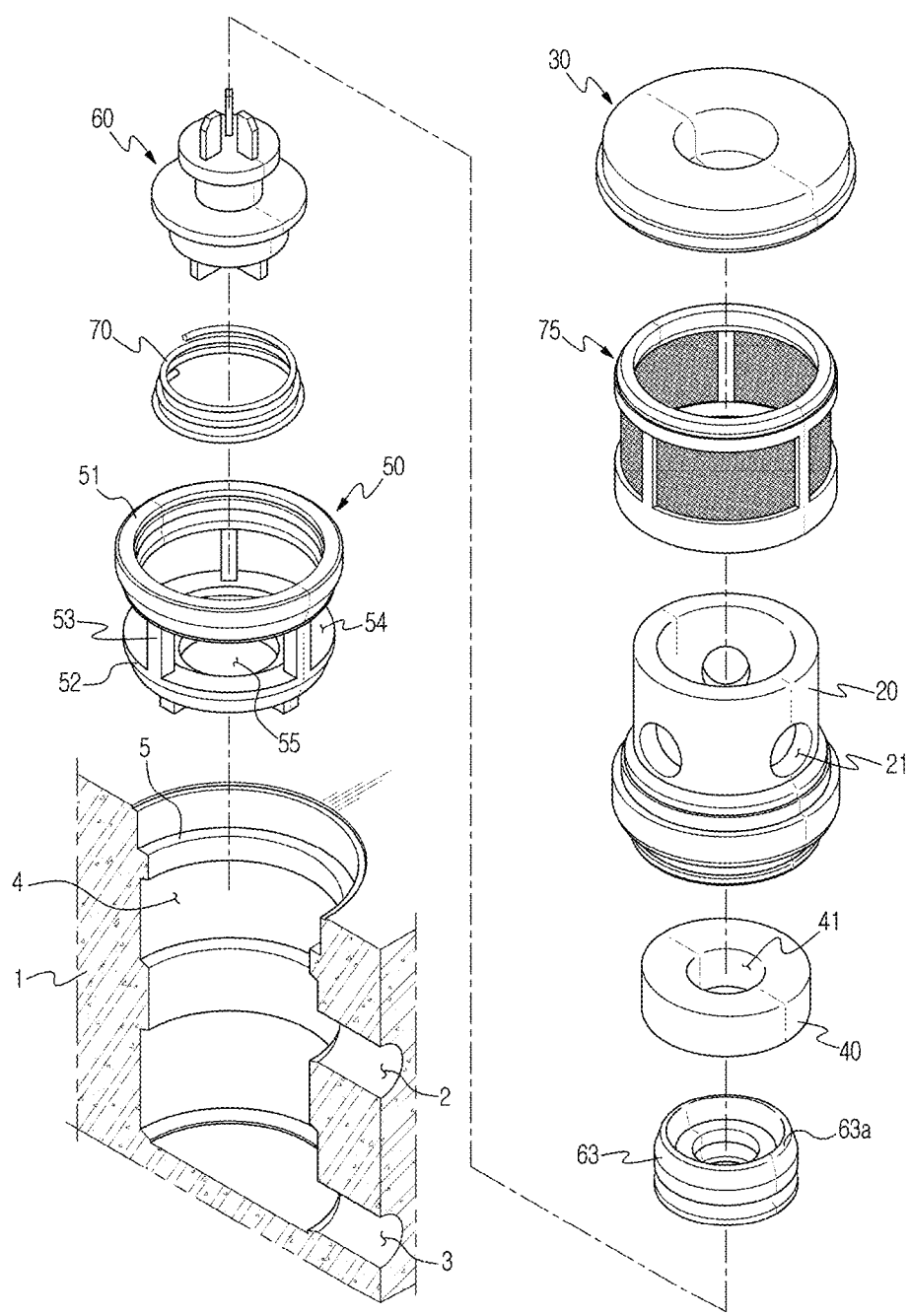
FIG. 1 is an exploded view of a check valve installed in a modulator block, according to an embodiment of the present disclosure.

Reference will now be made in detail to embodiments, examples of which are illustrated in the accompanying drawings. Embodiments as will be described below are suggested to fully deliver an idea of the present disclosure to ordinary skilled people in the art. The present disclosure may not be limited thereto but may be implemented in any other forms. To clarify the present disclosure, unrelated parts are omitted and the width, length, thickness, etc., of each element may be exaggerated for convenience in the drawings. Like reference numerals designate like elements throughout the specification.

Figure 2:
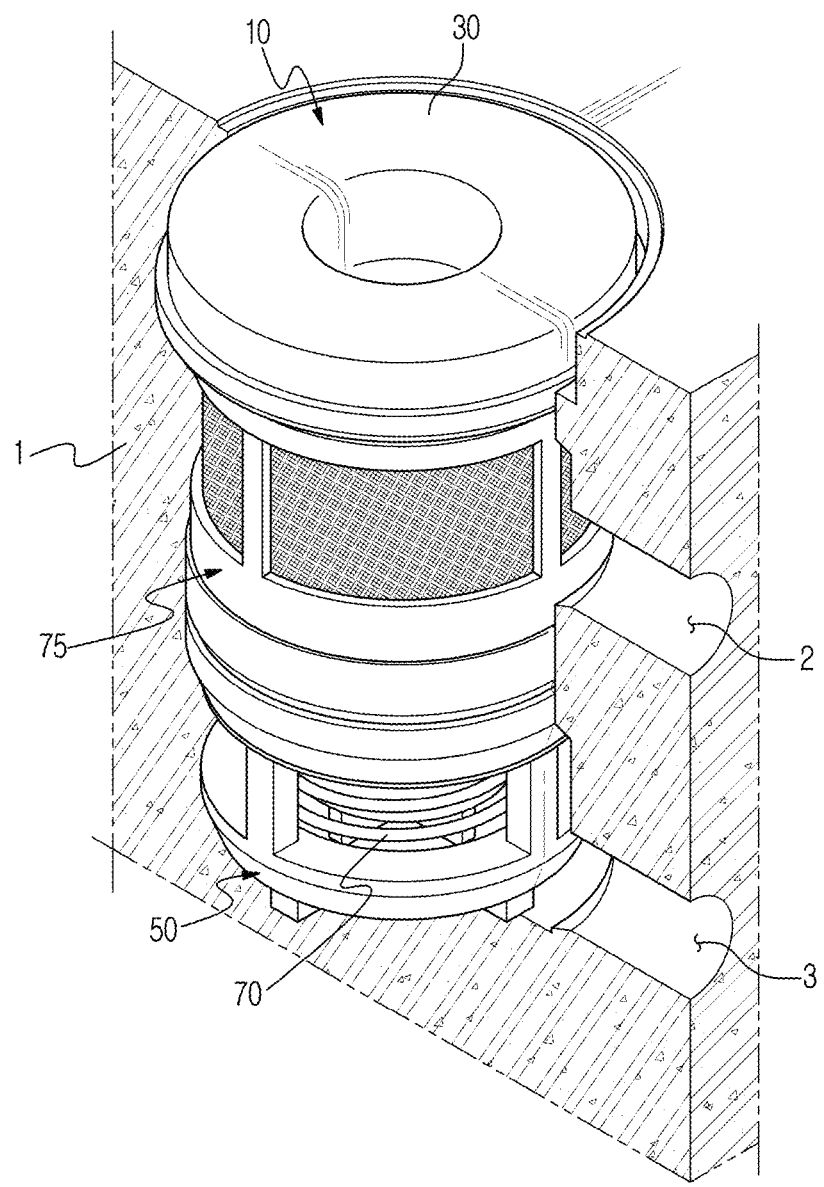
FIG. 2 is a perspective view of a check valve installed in a modulator block.
Figure 3:
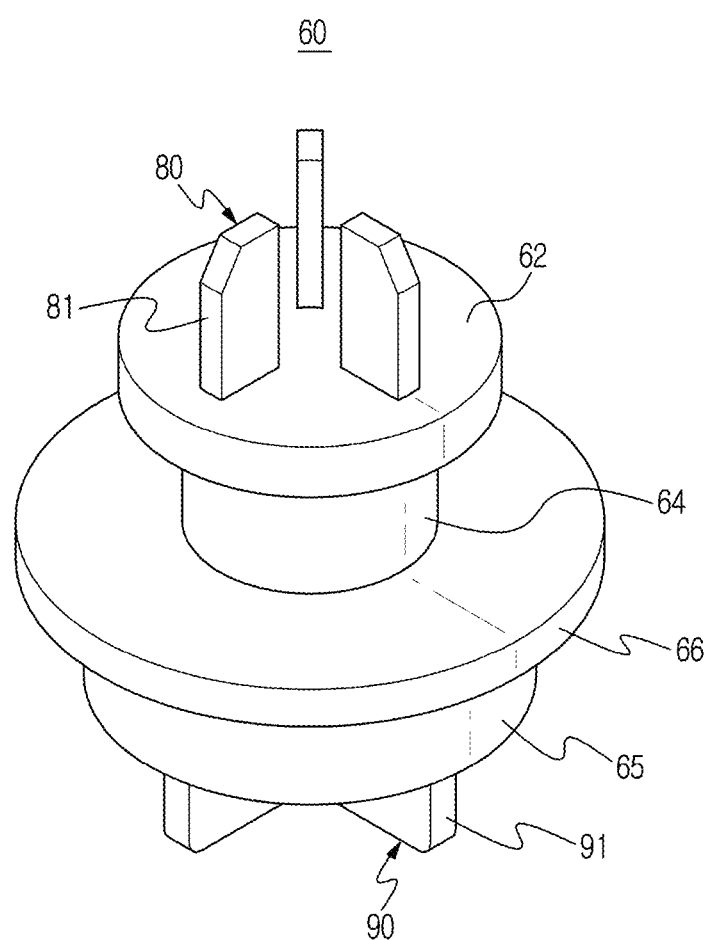
FIG. 3 is a perspective view of a plunger, according to an embodiment of the present disclosure.
Figure 4:
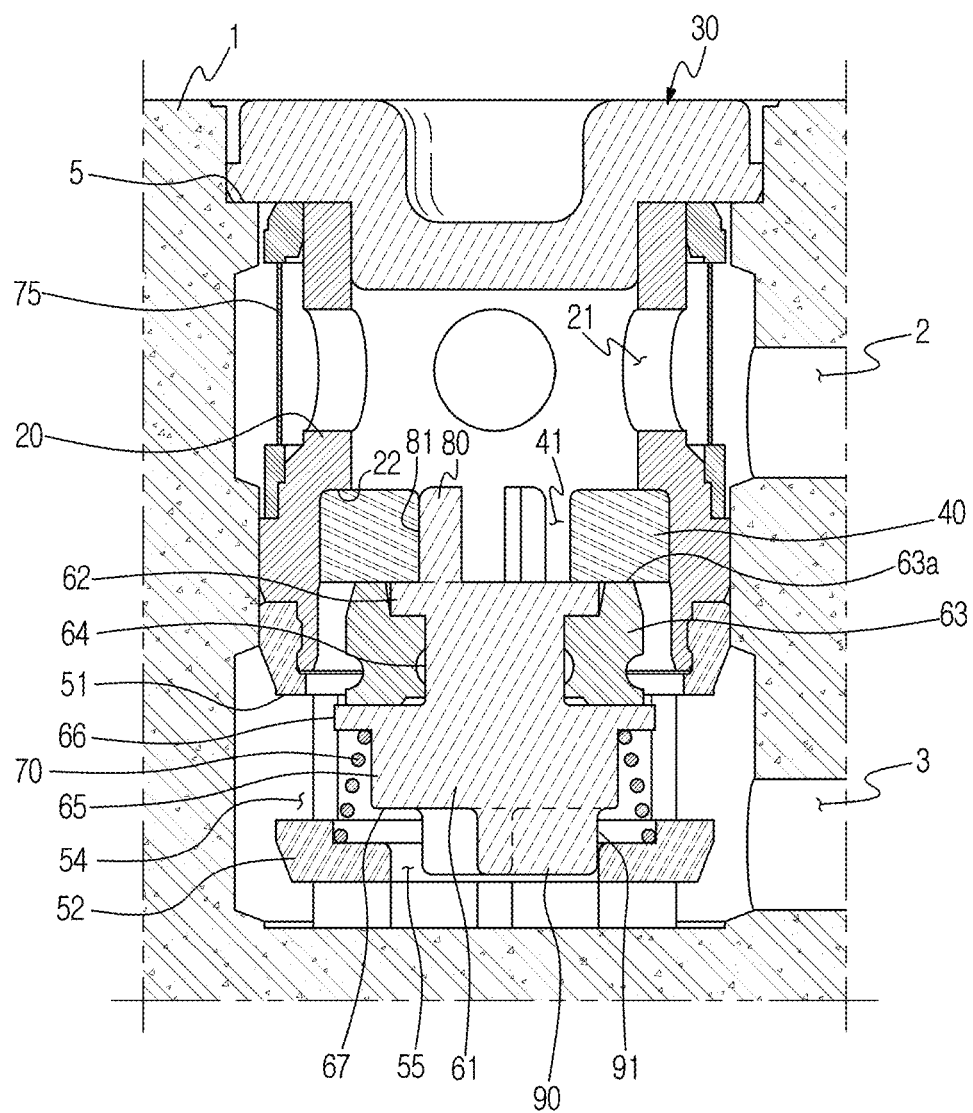
FIG. 4 is a cross-sectional view of a check valve, according to an embodiment of the present disclosure.

FIG. 1 is an exploded view of a check valve installed in a modulator block, according to an embodiment of the present disclosure, FIG. 2 is a perspective view of a check valve installed in a modulator block, FIG. 3 is a perspective view of a plunger, according to an embodiment of the present disclosure, and FIG. 4 is a cross-sectional view of a check valve, according to an embodiment of the present disclosure.

Referring to FIGS. 1 to 4, a check valve 10 in accordance with an embodiment of the present disclosure may be externally assembled in an integral form and installed in a bore 4 having an inlet fluid path 2 and an outlet fluid path 3 formed in a modulator block 1.

The check valve 10 includes a valve housing 20, an upper cap 30, a sheet member 40, a lower holder 50, and a plunger 60.

The valve housing 20 may have a hollow cylindrical form with both upper and lower ends opened and have a plurality of inlets 21 linked to the inlet fluid path 2 when mounted on the bore 4 of the modulator block 1 arranged along the circumferential face of the valve housing 20 at certain intervals.

The upper cap 30 may be coupled to cover the open top of the valve housing 20 and supported by a step 5 formed on an upper portion of the bore 4 when inserted to the bore 4 of the modulator block 1.

The sheet member 40 may have the form of a ring with certain thickness, and have an open orifice 41 formed in the center of the sheet member 40 to control a flow of oil.

The sheet member 40 may be press-fitted in the valve housing 20 by being inserted thereto through the open lower portion of the valve housing 20.

The valve housing 20 may have a step 22 formed on the inner wall of the valve housing 20 to constrain the position where the sheet member 40 is installed. When the top plane of the sheet member 40 is caught by the step 22, the inside of the valve housing 20 is divided by the sheet member 40 into upper space and lower space.

In the upper space of the valve housing 20, the inlets 21 linked to the inlet fluid path 2 are located, and in the lower space of the valve housing 20, outlets 54 linked to the outlets 3 are located.

The outlets 54 may be formed in the lower holder 50 to be coupled to the open bottom of the valve housing 20.

The lower holder 50 includes a ring-shaped top plate 51 coupled to the lower end of the valve housing 20, a ring-shaped bottom plate 52 separated from the top plate 51 by a certain distance, and a plurality of connecting bars connecting the top plate 51 and the bottom plate 52.

As the plurality of connecting bars 53 are arranged in the circumferential direction of the lower holder 50 at certain intervals, the outlets 54 linked to the outlet fluid path 3 formed in the modulator block 1 are formed in the space between the connecting bars 53.

The orifice 41 linking between the inlets 21 and the outlets 54 may be selectively opened or closed by the plunger 60 located in the lower space of the valve housing 20.

The plunger 60 may include a plunger body 61 in the form of a cylinder elongated in the vertical direction, and the plunger body 61 may be installed to be able to move up and down while the lower side of the plunger body 61 is being elastically supported by the elastic member 70 supported by the bottom plate 52 of the lower holder 50.

A disc-shaped sheet portion 62 may be formed at the upper end of the plunger body 61, and the sheet portion 62 may make close contact with or may be separated from the bottom face of the sheet member 40 to selectively open or close the orifice 41 of the sheet member 40.

The plunger body 61 may have the form of multiple steps having different diameters in the vertical direction of the plunger body 61, and may have a seal attachment portion 64 where a sealing member 63 is attached under the sheet portion 62 and an elastic member attachment portion 65 to which the elastic member 70 is fitted.

The seal attachment portion 64 may be concaved between the sheet portion 62 and a disc-shaped supporting portion 66 separated from the sheet portion 62 down by a certain distance to support the upper end of the elastic member 70.

The sealing member 63 is a rubber-like elastic body and is shaped like a ring. When the sealing member 63 is fitted and coupled to the seal attachment portion 64, a sealing portion 63a formed on the top of the sealing member 63 protrudes upward further than he sheet portion 62. Accordingly, when the sheet portion 62 is moved to come into close contact with the bottom face of the sheet member 40, the sealing portion 63a of the sealing member 63 first contacts the bottom face of the sheet member 40, performing the primary sealing, and then the top face of the sheet portion 62 makes planar contact with the bottom face of the sheet member 40, performing the secondary sealing. Therefore, even if the sealing member 63 wears out from repetitive use, sealing is secured by the sheet portion 62 and thus the tightness may be significantly improved.

To keep this tightness, the sheet portion 62 may be formed to have a larger diameter than the orifice 41, and the outer diameter of the sealing portion 63a may be larger than that of the sheet portion 62 in order to enclose the outer circumference of the sheet portion 62.

Furthermore, the supporting portion 66 may have a larger diameter than the sealing member 63 to stably support the lower end of the sealing member 63.

The elastic member attachment portion 65 may have the form of a cylinder, which is formed by extending a certain length under the supporting portion 66, and have a smaller diameter than the supporting portion 66 for the elastic member 70 to be fitted thereto.

While the elastic member 70 is fitted in the elastic member attachment portion 65, the upper end of the elastic member 70 may be elastically supported by the bottom face of the supporting portion 66 and the lower end of the elastic member 70 may be elastically supported by the top face of the bottom plate 52. Accordingly, the elastic member 70 may elastically press the plunger 60 in the upward direction in which the plunger 60 seals up the orifice 41.

Guides are provided at both upper and lower ends of the plunger 60 to attain quick reaction performance due to movement stability by enabling stable linear motion of the plunger 60 when the plunger 60 moves up or down while being supported by the elastic member 70 in the lower holder 50.

The guides include at least one upper projection 80 formed at the uppermost end and at least one lower projection 90 formed at the lowermost end of the plunger 60.

The at least one upper projection 80 extends a certain length upward from the top face of the sheet portion 62 and may contact and slidingly move on the inner circumferential face of the orifice 41, and the at least one lower projection 90 extends a certain length downward from the bottom face of the elastic member attachment portion 65 and may contact and slidingly move on the inner circumferential face of a guide hole 55.

The at least one upper projection 80 may have the form of a bar and may be arranged on the top face of the sheet portion 62 along the circumferential direction corresponding to the diameter of the orifice 41 at certain intervals. Although three upper projections 80 arranged along the circumferential direction of the orifice 41 at regular intervals are shown in the accompanying drawings, embodiments of the present disclosure are not limited thereto.

The at least one upper projection 80 may be positioned to be slidingly moved while the outer face 81 of each upper projection 80, which is located on the outer side of the sheet portion 62 in the radial direction, contacts the inner wall of the orifice 41. The at least one upper projection 80 has a structure to guide the movement of the plunger 60 and has such a shape and size that does not interfere with the orifice 41 as the orifice 41 is used.

The at least one lower projection 90 may move up or down stably by being guided by the open guide hole 55 located in the center of the bottom plate 52 of the lower holder 50.

The at least one lower projection 90 may have a diameter corresponding to the diameter of the guide hole 55, but may be formed of radial ribs to reduce the weight of the plunger 60 so as to facilitate movement stability. Although there are three lower projections 90 arranged at regular intervals for stable support, the number of the lower projections 90 may vary properly. The outer face 91 of the at least one lower projection 90 is slidingly moved while coming into contact with the inner wall of the guide hole 55.

The at least one lower projection 90 located on the bottom face of the elastic member attachment portion 65 may be positioned such that the outer face 91 of the lower projection 90 does not go beyond the elastic member attachment portion 65 but the diameter of a circle formed by connecting the respective outer faces 91 is smaller than that of the elastic member attachment portion 65. This makes the bottom end 67 of the elastic member attachment portion 65 caught by the bottom plate 52 as the plunger 60 moves down, thereby constraining the down movement position of the plunger 60.

In the meantime, a filter member 75 may be coupled to the outer face of the valve housing 20 by covering the inlet 21 to filter out foreign materials.

Figure 5:
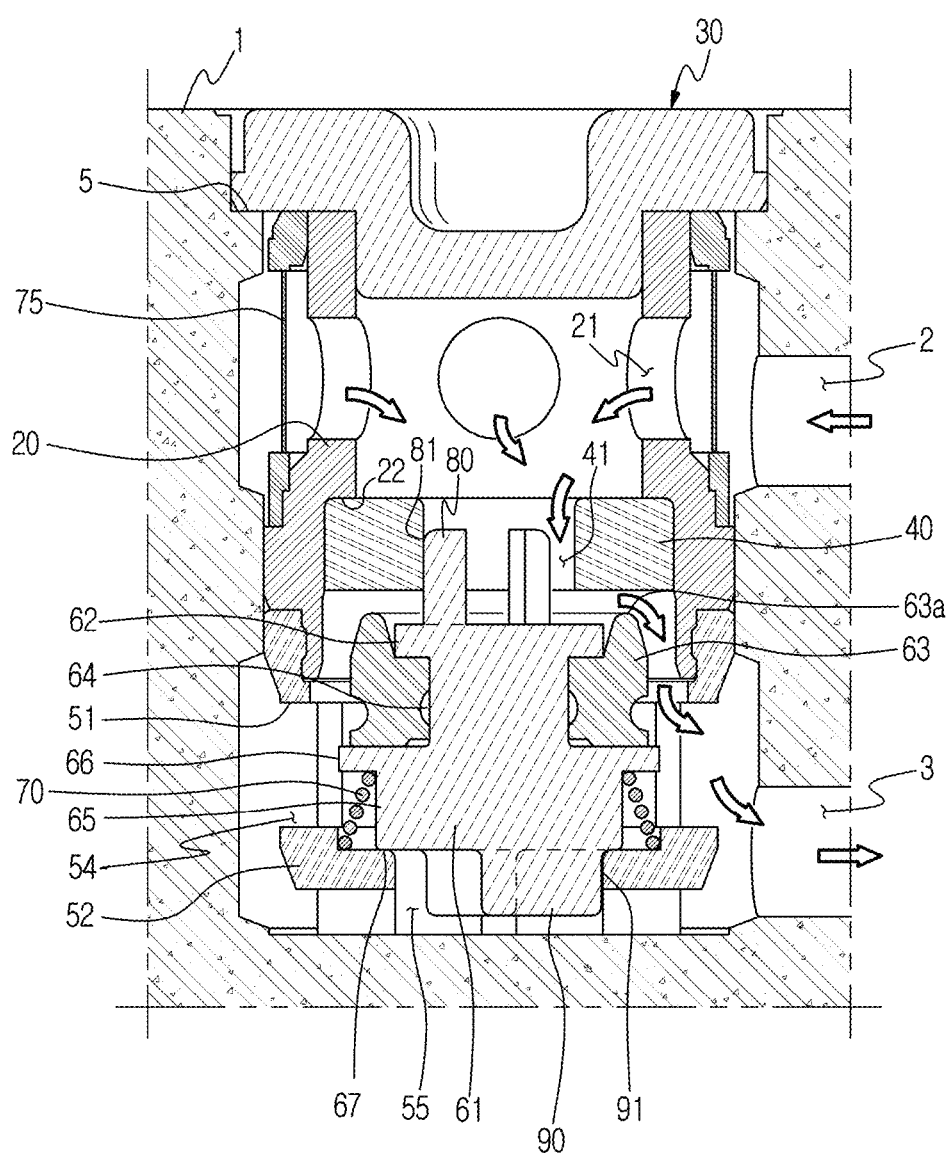
FIG. 5 shows an operational state of a check valve in which an orifice is open, according to an embodiment of the present disclosure.

Operation of the check valve according to embodiments of the present disclosure will now be described in connection with FIG. 5. FIG. 5 shows an operational state of a check valve in which an orifice is open, according to an embodiment of the present disclosure.

Referring to FIG. 5, when oil flows in through the inlet fluid path 2, it is filtered by the filter member 75 and then flows into the inlet 21 of the valve housing 20. If the pressure of the oil flowing in is greater than the elastic force of the elastic member 70, the plunger 60 is moved down and thus the orifice 41 is opened. In this regard, the plunger 60 is able to make stable linear motion by the guides 80 and 90 equipped at the both upper and lower ends, thereby securing quick reactivity due to the movement stability.

If the pressure of the oil is less than the elastic force of the elastic member 70, the plunger 60 is pressed by the elastic member 70 and moved up toward the sheet member 40. As the plunger 60 is moved, the sealing portion 63a of the sealing member 63 first makes contact with the bottom face of the sheet member 40 to perform the primary sealing and then the top face of the sheet portion 62 of the plunger 60 closely contacts the bottom face of the sheet member 40 through planar contact to perform the secondary sealing. Accordingly, even if the sealing member 63 wears out from repetitive use, the backup sealing is enabled, thereby significantly reducing the probability of leakage.

Figure 6:
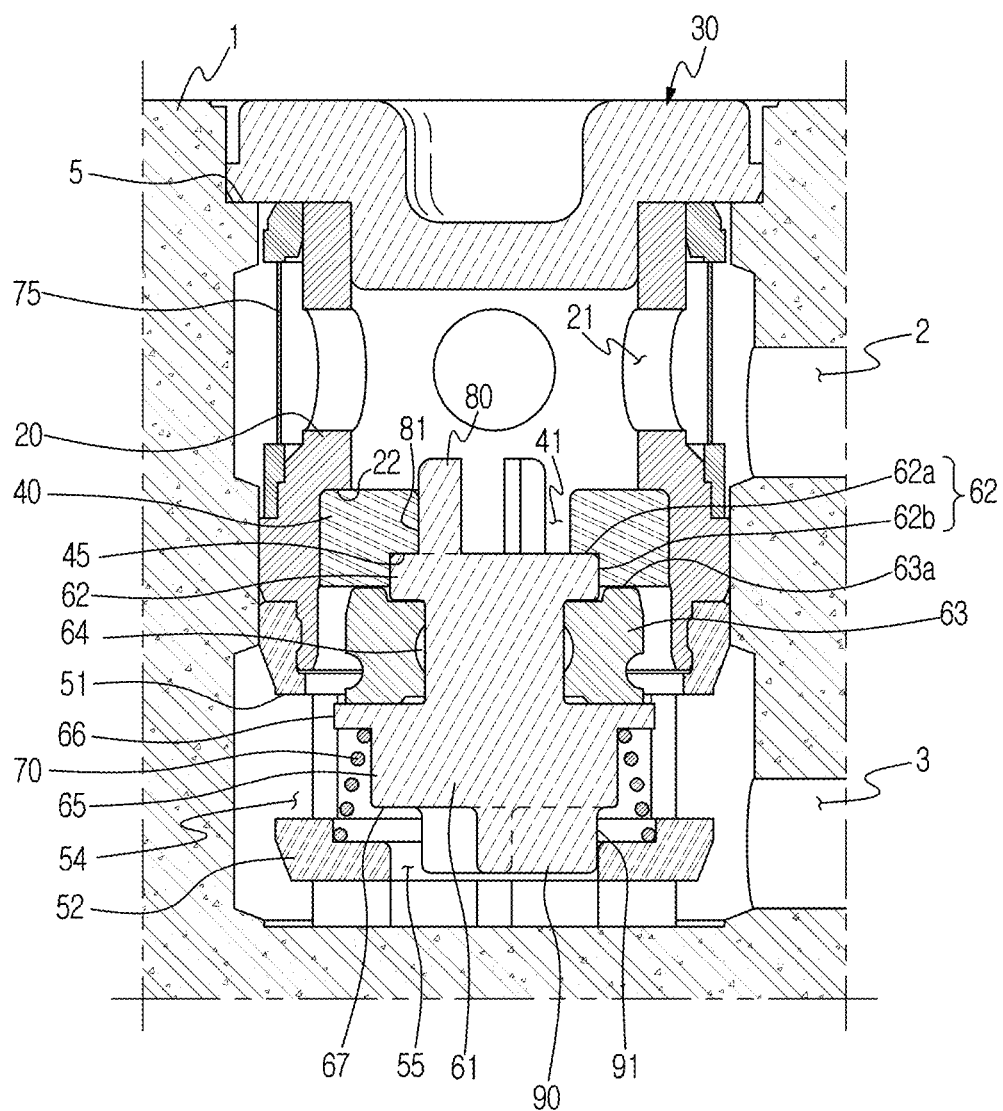
FIG. 6 is a cross-sectional view of a check valve, according to another embodiment of the present disclosure.

A check valve in accordance with another embodiment of the present disclosure will now be described. FIG. 6 shows a check valve, according to another embodiment of the present disclosure. In FIG. 6, the same reference numerals are used for the same elements as in the previous embodiment, and the overlapping explanation will not be repeated.

The check valve 10 shown in FIG. 6 has the same structure as the check valve in the previous embodiment except for the structure of the contact face between the sheet portion 62 of the plunger 60 and the bottom face of the sheet member 40, which has a sealing function for the orifice 41.

Referring to FIG. 6, a sheet portion receiving groove 45 is formed in the lower portion of the sheet member 40 to be concaved with a diameter corresponding to the sheet portion 62 to have a two-phase sealing face that comes into contact with the sheet portion 62. With this structure, when the sheet portion 62 of the plunger 60 is positioned to contact the sheet member 40 in order to seal up the orifice 41, the two neighboring faces, top face 62a and side face 62b, on the edge of the sheet portion 62 make close contact with the inner face of the sheet portion receiving groove 45.

This structure may prevent the sealing member 63 from being deformed and crushed in between the contact faces of the sheet portion 62 and the sheet member 40 when the sheet portion 62 of the plunger 60 makes close contact with the sheet member 40.

Figure 7:
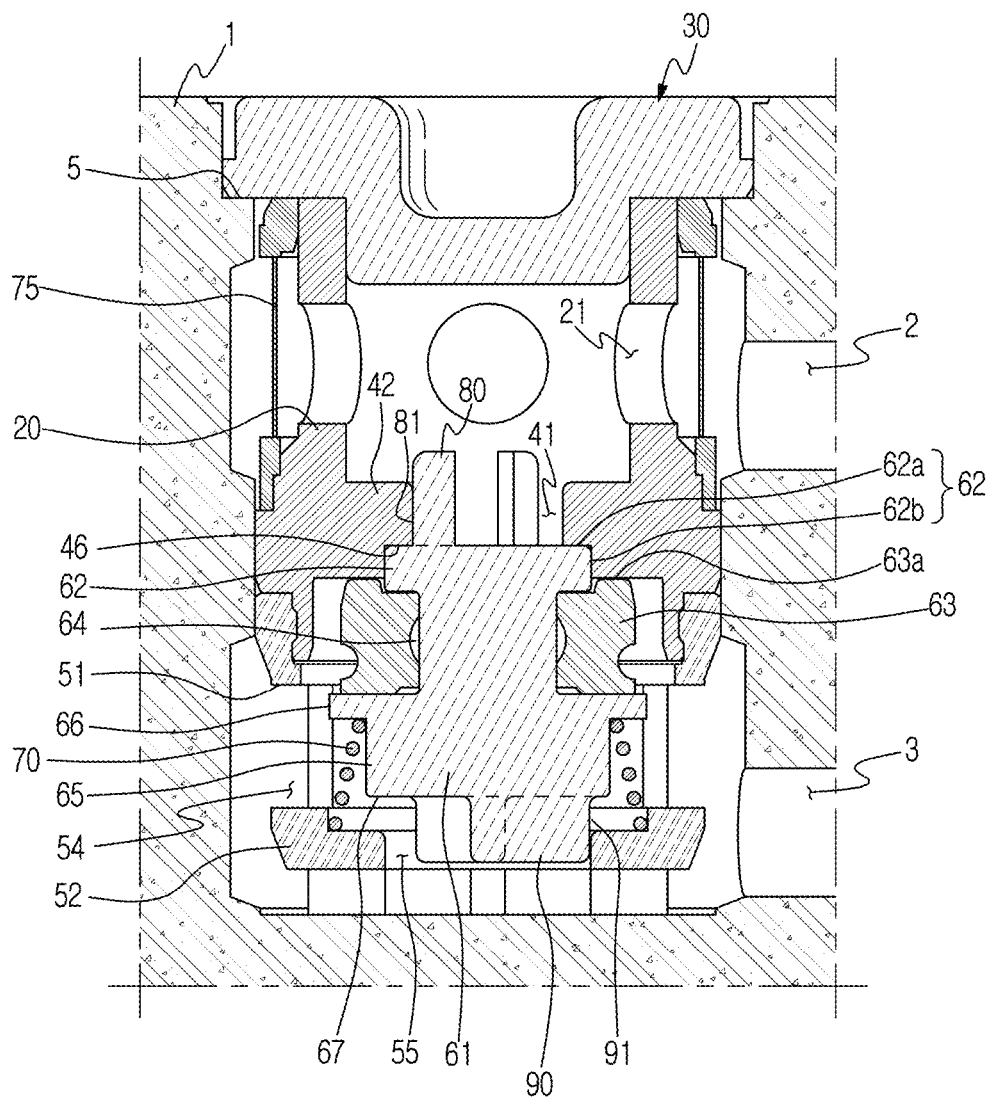
FIG. 7 shows a check valve, according to another embodiment of the present disclosure.

A check valve in accordance with another embodiment of the present disclosure will now be described. FIG. 7 shows a check valve, according to another embodiment of the present disclosure.

This embodiment is the same as the previous embodiment except that the sheet member 40 is not separately formed but integrated with the inner wall of the valve housing 20.

Specifically, along the inner circumferential wall of the valve housing 20, a ring-shaped sheet forming portion 42 extending inward from the inner wall of the valve housing 20 is provided to form the orifice 41, and the orifice 41 is formed in the center of the sheet forming portion 42.

A sheet portion receiving groove 46 is formed in the lower portion of the sheet forming portion 42 to be concaved with a diameter corresponding to the sheet portion 62 to make a sealing face by contacting the disc-shaped sheet portion 62.

When the sheet portion 62 of the plunger 60 is inserted to the sheet portion receiving groove 46 in order to seal up the orifice 41, the top face 62a and the side face 62b of the sheet portion 62 make close contact with the inner face of the sheet portion receiving groove 46.

In this case, to prevent the sealing member 63 from being deformed and crushed in a gap between the sheet portion 62 and the sheet portion receiving groove 46, the sealing portion 63a of the sealing member 63 may be formed not to protrude further than the top face 62a of the sheet portion 62 when the sealing member 63 is in a state of not contacting the sheet forming portion 42.

A check valve in accordance with another embodiment of the present disclosure will now be described. In this embodiment as will be described below, the check valve 10 has the same structure as in the first embodiment except for the structure of the guides for guiding movement of the plunger 60 and the structure of the orifice. The same reference numerals will be allocated to the elements having the same functions.

Figure 8:
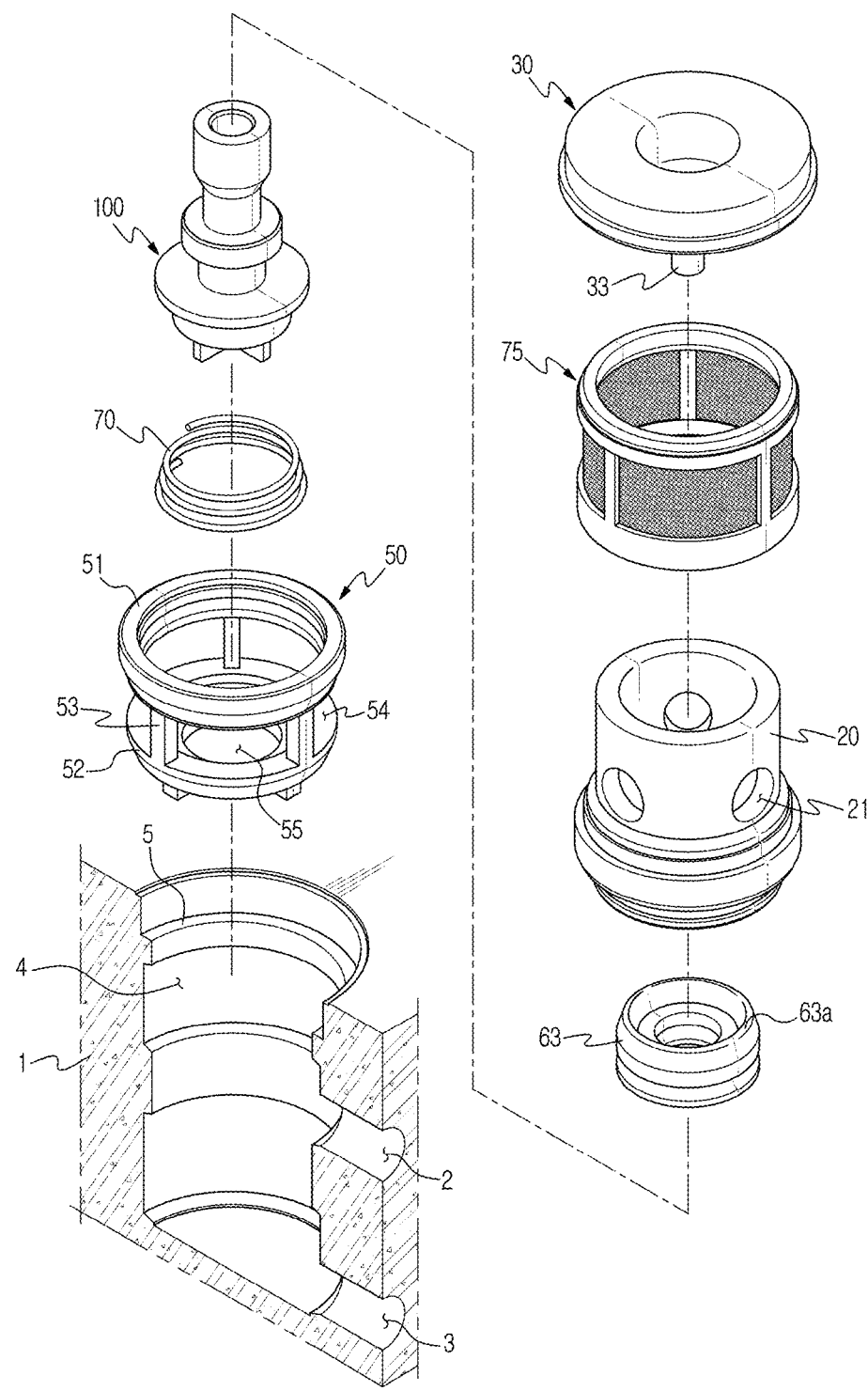
FIG. 8 is an exploded view of a check valve installed in a modulator block, according to another embodiment of the present disclosure.
Figure 9:
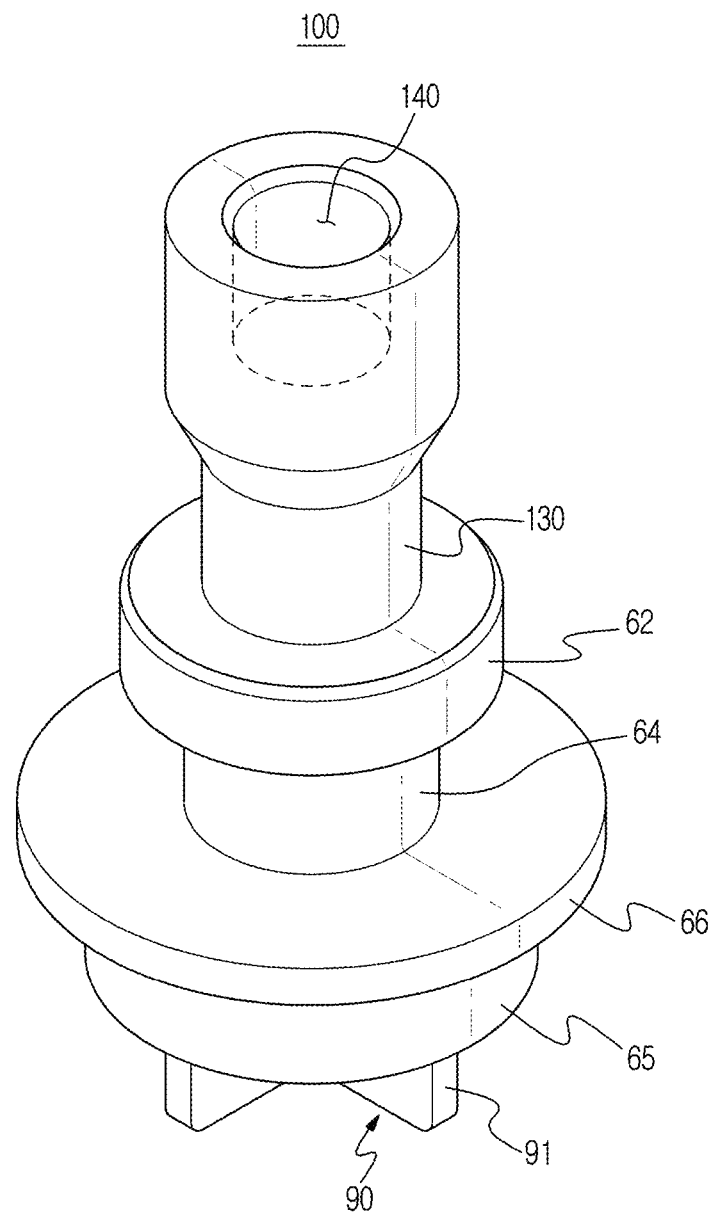
FIG. 9 is a perspective view of a plunger, according to another embodiment of the present disclosure.
Figure 10:
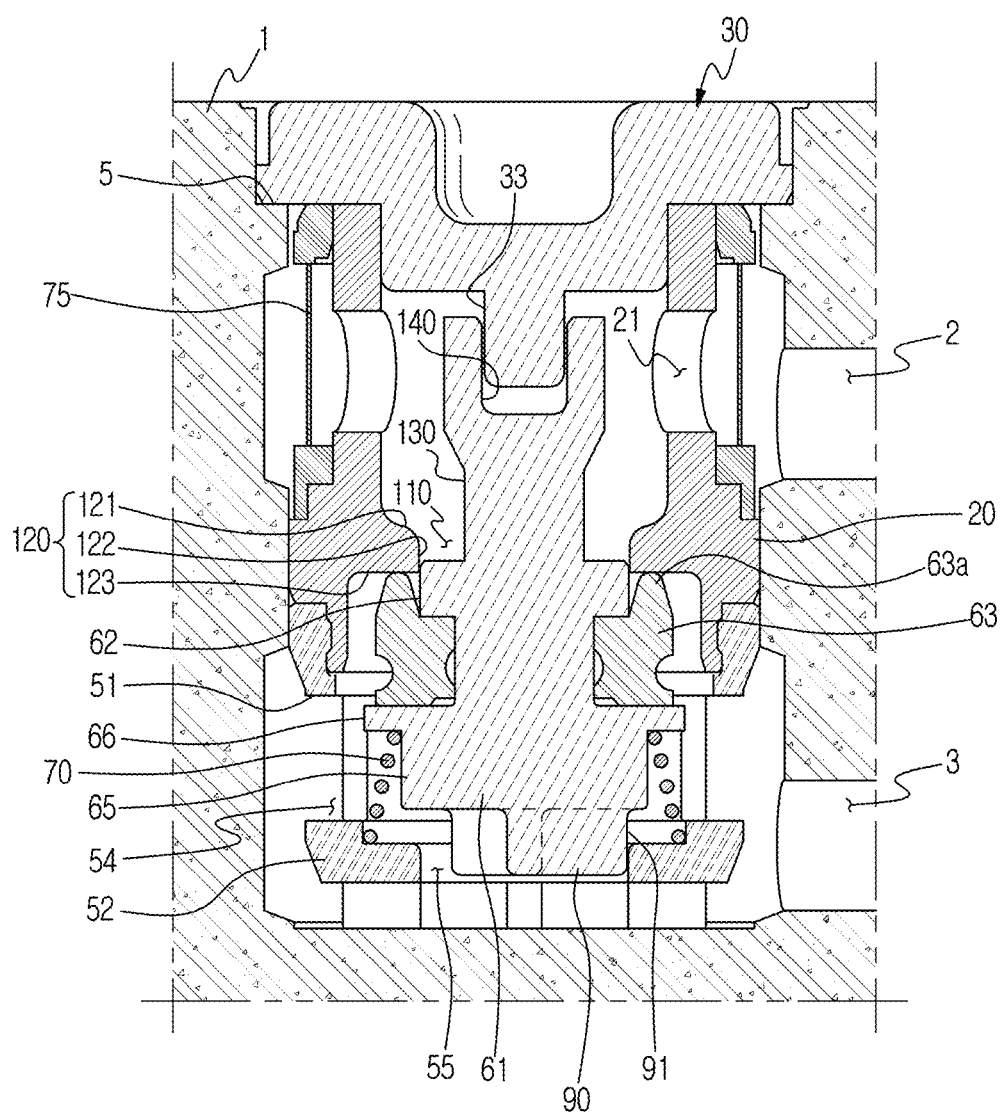
FIG. 10 is a cross-sectional view of a check valve, according to another embodiment of the present disclosure.
Figure 11:
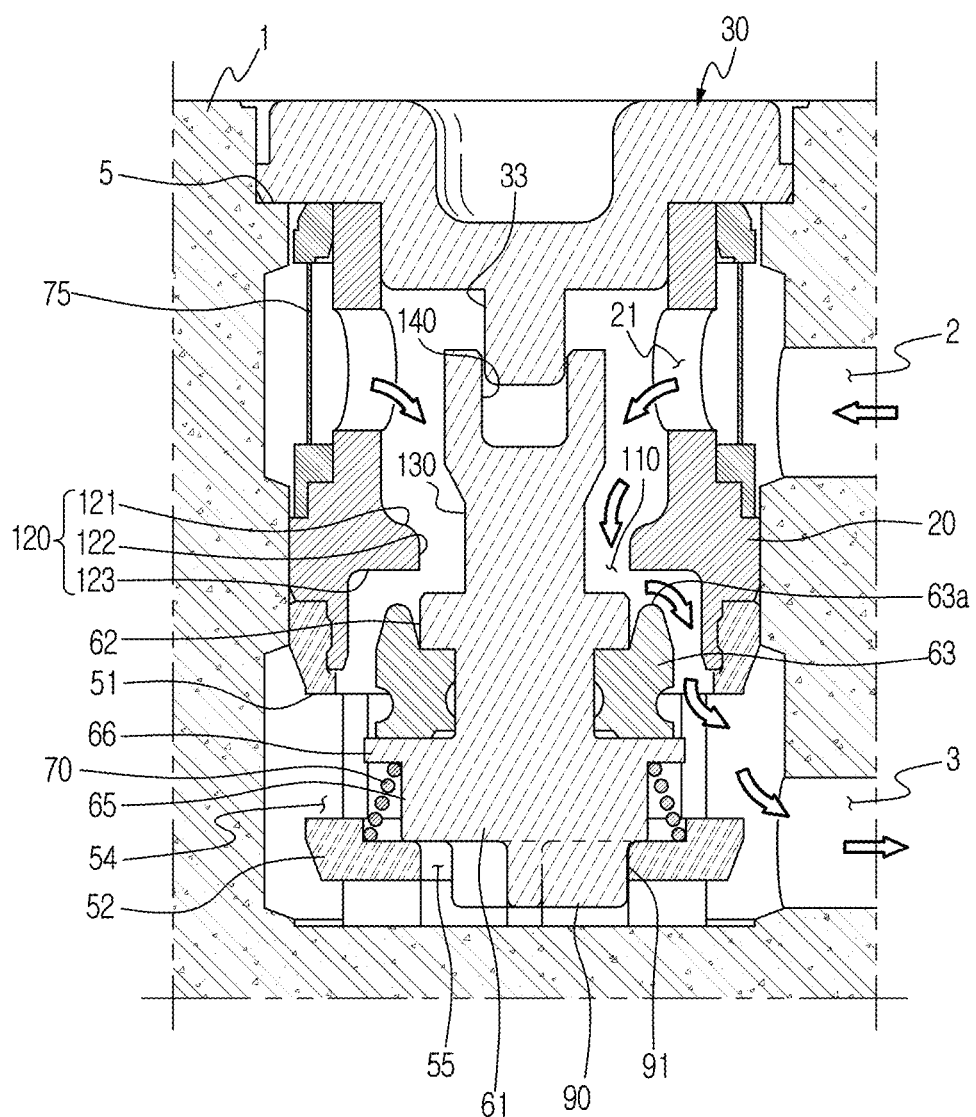
FIG. 11 shows an operational state of a check valve in which an orifice is open, according to another embodiment of the present disclosure.

FIG. 8 is an exploded view of a check valve installed in a modulator block, according to another embodiment of the present disclosure, FIG. 9 is a perspective view of a plunger, according to another embodiment of the present disclosure, FIG. 10 is a cross-sectional view of a check valve, according to another embodiment of the present disclosure, and FIG. 11 shows an operational state of a check valve in which an orifice is open, according to another embodiment of the present disclosure.

Referring to FIGS. 8 to 11, a sheet forming portion 120 extending inward from the inner wall of the valve housing 20 is provided along the inner circumferential wall of the valve housing 20 to form an orifice 110.

The sheet forming portion 120 includes a curved plane 121 guiding the oil flowing in through the inlet 21 downward to be smoothly moved to the outlet 54 through the orifice 110, a vertical plane 122 extending vertically from the bottom end of the curved plane 121 to be able to contact the sheet portion 62, and a horizontal plane 123 bending at the right angle from the bottom end of the vertical plane 122 and contacting the sealing member 63.

The plunger 100 may include a plunger body 61 in the form of a cylinder elongated in the vertical direction, and the plunger body 61 may be positioned to be able to move up and down while the lower side of the plunger body 61 is being elastically supported by the elastic member 70 supported by the bottom plate 52 of the lower holder 50.

The sheet portion 62 included in the plunger body 61 selectively opens or closes the orifice 110 by selectively contacting the sheet forming portion 120. Specifically, the at least one lower projection 90 that is able to slidingly move while contacting the inner circumferential face of the guide hole 55 is provided on the bottom end of the plunger body 61; the sheet portion 62 to selectively open or close the orifice 110 is located in the longitudinal center of the plunger body 61; a cylinder-shaped fluid path forming portion 130 extending upward from the sheet portion 62 past the orifice 110 is provided on the sheet portion 62 to have a smaller diameter than the sheet portion 62 to form the orifice 110 along with the vertical plane 122 of the sheet forming portion 120; and a guide hole 140 is formed at the top end of the fluid path forming portion 130 to guide the plunger body 61 to be stably moved.

A guide projection 33 protruding downward from the upper cap 30 is coupled to the guide hole 140 formed in the upper portion of the plunger body 61 to be slidingly moved therein. As the plunger body 61 moves up or down, the upper portion of the plunger body 61 is guided by the guide projection 33, thereby making stable linear motion.

The sealing member 63 is a rubber-like elastic body and is shaped like a ring. When the sealing member 63 is fitted and coupled to the seal attachment portion 64, the sealing member 63 is positioned into the form of enclosing the sheet portion 62. Accordingly, when the sheet portion 62 is moved to seal up the orifice 41, the sealing portion 63a at the top end of the sealing member 63 comes into contact with the horizontal plane 123 of the sheet forming portion 120 and the side of the sheet portion 62 comes into contact with the vertical plane 122 of the sheet forming portion 120, thereby sealing up the orifice 41. Therefore, even if the sealing member 63 wears out from repetitive use, sealing is secured by the sheet portion 62 and thus the tightness may be significantly improved.

To keep this tightness, the sheet portion 62 may be formed to have a diameter corresponding to the diameter of the orifice 41, and the outer diameter of the sealing portion 63a may be larger than that of the sheet portion 62 in order to enclose the outer circumference of the sheet portion 62.

With this structure, as shown in FIG. 10, when oil flows in through the inlet fluid path 2, it is filtered by the filter member 75 and then flows into the inlet 21 of the valve housing 20. If the pressure of the oil flowing in is greater than the elastic force of the elastic member 70, the plunger 100 is moved down and thus the orifice 110 is opened. In this regard, the plunger 100 is able to make stable linear motion by the guides 140 and 90 equipped at the both upper and lower ends, thereby securing quick reactivity due to the movement stability.

According to embodiments of the present disclosure, a plunger to selectively open or close an orifice may be stably moved, thereby attaining good reactivity due to the movement stability.

Furthermore, according to embodiments of the present disclosure, sealing performance of a check valve may be improved due to double-sealing structure.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. A check valve installed in a bore of a modulator block having an inlet fluid path and an outlet fluid path to control one-way flow of oil, the check valve comprising:
a valve housing having upper and lower ends opened and having an inlet defined along the circumference of the valve housing, the inlet linked to the inlet fluid path;
an upper cap coupled to seal up an open upper portion of the valve housing;
a lower holder coupled to an open lower portion of the valve housing, having an outlet defined along the circumference of the lower holder, the outlet linked to the outlet fluid path, and having a first guide hole in a lower portion of the lower holder;
a sheet member supported by the inner wall of the valve housing and having an orifice extending through a planar surface of the sheet member; and
a plunger installed to move up or down to selectively open or close the orifice while elastically supported by an elastic member supported by the lower holder,
wherein the plunger comprises:
guides at upper and lower ends of the plunger to guide the plunger to make stable linear motion;
a disc-shaped sheet portion radially protruding at a top end of the plunger;
a disc-shaped supporting portion radially protruding at a middle of the plunger; and
a sealing member attached to the plunger entirely between the sheet portion and the supporting portion, and
wherein the disc-shaped sheet portion and the sealing member are in selective contact with the planar surface of the sheet member to selectively open or close the orifice.

2. The check valve of claim 1, wherein the guides at the upper and lower ends of the plunger are configured to move by being guided into the orifice and the first guide hole, respectively.

3. The check valve of claim 2, wherein the sheet portion is in contact with a bottom face of the sheet member to selectively open or close the orifice, and
wherein the plunger further comprises a disc-shaped elastic member attachment portion in a lower portion of the plunger for the elastic member to be fitted to the elastic member attachment portion.

4. The check valve of claim 3, wherein the guide at the upper end of the plunger comprises at least one upper projection extending upward from a top face of the sheet portion and contacting and slidingly moving on an inner circumferential face of the orifice, and
the guide at the lower end of the plunger comprises at least one lower projection extending downward from a bottom face of the elastic member attachment portion and contacting and slidingly moving on an inner circumferential face of the first guide hole.

5. The check valve of claim 4, wherein the at least one upper projection is arranged on the top face of the sheet portion along a circumferential direction corresponding to a diameter of the orifice at predetermined intervals not to seal up the orifice.

6. The check valve of claim 3, wherein the sealing member is in contact with the bottom face of the sheet member when the sheet portion seals up the orifice.

7. The check valve of claim 6, further comprising a seal attachment recess along the circumferential direction of the plunger located between the sheet portion and the supporting portion to couple with the sealing member.

8. The check valve of claim 3, wherein a diameter of the elastic member attachment portion is larger than a diameter of the first guide hole in order to constrain a position of down movement of the plunger when the plunger moves down.

9. The check valve of claim 3, wherein the sheet member has a sheet portion receiving groove recessed in a lower portion of the sheet member, the sheet portion receiving groove recessed to have a diameter corresponding to the sheet portion.

10. The check valve of claim 2, wherein the valve housing comprises a step on the inner face of the valve housing to support a top face of the sheet member, and
wherein the inlet and the outlet are divided vertically by the sheet member supported by the step.

11. The check valve of claim 2, further comprising a filter member coupled to the valve housing to filter out foreign materials flowing into the inlet.

12. A check valve installed in a bore of a modulator block having an inlet fluid path and an outlet fluid path to control one-way flow of oil, the check valve comprising:
a valve housing having upper and lower ends opened and having an inlet defined along the circumference of the valve housing, the inlet linked to the inlet fluid path;

an upper cap coupled to seal up an open upper portion of the valve housing;

a lower holder coupled to an open lower portion of the valve housing, having an outlet defined along the circumference of the lower holder, the outlet linked to the outlet fluid path, and having a first guide hole in a lower portion of the lower holder; and a plunger installed to move up or down to selectively open or close an orifice while elastically supported by an elastic member supported by the lower holder, wherein the valve housing has a sheet forming portion on an inner circumferential wall of the valve housing, the sheet forming portion extending inward from the valve housing to define the orifice, wherein the plunger comprises:
- a plunger body having a cylinder shape elongated in a vertical direction;
- at least one lower projection protruding at a bottom end of the plunger body and configured to slidingly move by coming into contact with an inner circumferential face of the first guide hole;
- a second guide hole defined at a top end of the plunger body and configured to move by being guided by a guide projection protruding from a lower side of the upper cap;
- a disc-shaped sheet portion radially protruding from a longitudinal center of the plunger body to come into contact with an inner circumferential face of the sheet forming portion in order to selectively open or close the orifice;
- a disc-shaped supporting portion radially protruding from the plunger body between the sheet portion and the at least one lower projection;
- a fluid path forming portion having a diameter smaller than a diameter of the sheet portion and located between the sheet portion and the top end of the plunger body; and
- a sealing member attached to the plunger body entirely between the sheet portion and the supporting portion, wherein the sealing member is configured to be in contact with a bottom face of the sheet forming portion to seal up the orifice, and wherein the sheet forming portion comprises:
- a curved surface guiding oil flowing in through the inlet downward, the curved surface transitioning to the inner circumferential face of the sheet forming portion via a bottom end of the curved surface; and
- a horizontal plane bending at the right angle from a bottom end of the inner circumferential face of the sheet forming portion to contact the sealing member.

13. A check valve installed in a bore of a modulator block having an inlet fluid path and an outlet fluid path to control one-way flow of oil, the check valve comprising:

a valve housing having upper and lower ends opened and having an inlet defined along the circumference of the valve housing, the inlet linked to the inlet fluid path;

an upper cap coupled to seal up an open upper portion of the valve housing;

a lower holder coupled to an open lower portion of the valve housing, having an outlet defined along the circumference of the lower holder, the outlet linked to the outlet fluid path, and having a first guide hole in a lower portion of the lower holder; and a plunger installed to move up or down to selectively open or close a cylindrical orifice while elastically supported by an elastic member supported by the lower holder, wherein the valve housing has a sheet forming portion on an inner circumferential wall of the valve housing, the sheet forming portion extending inward from the valve housing to define the cylindrical orifice, wherein the plunger comprises:
- a plunger body having a cylinder shape elongated in a vertical direction;
- at least one lower projection protruding at a bottom end of the plunger body and configured to slidingly move by coming into contact with an inner circumferential face of the first guide hole;
- a second guide hole defined at a top end of the plunger body and configured to move by being guided by a guide projection protruding from a lower side of the upper cap;
- a cylindrical sheet portion radially protruding from a longitudinal center of the plunger body to come into contact with an inner circumferential face of the cylindrical orifice of the sheet forming portion in order to selectively open or close the cylindrical orifice;
- a disc-shaped supporting portion radially protruding from the plunger body between the sheet portion and the at least one lower projection;
- a fluid path forming portion having a diameter smaller than a diameter of the sheet portion and located between the sheet portion and the top end of the plunger body; and
- a sealing member attached to the plunger body entirely between the sheet portion and the supporting portion.

14. The check valve of claim 13, wherein the fluid path forming portion is configured to define the orifice along with the sheet forming portion when the plunger body moves down.

15. The check valve of claim 13, wherein the sealing member is configured to be in contact with a bottom face of the sheet forming portion to seal up the orifice.

16. The check valve of claim 13, wherein the sheet forming portion comprises:
- a curved surface guiding oil flowing in through the inlet downward, the curved surface transitioning to the inner circumferential face of the orifice via a bottom end of the curved surface; and
- a horizontal plane bending at the right angle from a bottom end of the inner circumferential face of the orifice to contact the sealing member.

* * * * *